United States Patent

Li et al.

[11] Patent Number: 5,824,565
[45] Date of Patent: Oct. 20, 1998

[54] METHOD OF FABRICATING A SENSOR

[75] Inventors: Guang Xuan Li; Zuoying Lisa Zhang, both of Gilbert; Frank A. Shemansky, Jr., Phoenix, all of Ariz.

[73] Assignee: Motorola, Inc., Schaumburg, Ill.

[21] Appl. No.: 608,790

[22] Filed: Feb. 29, 1996

[51] Int. Cl.6 .................................................. H01L 21/00
[52] U.S. Cl. ................................................ 438/48; 438/52
[58] Field of Search ................................ 438/48, 50, 52, 438/53

[56] References Cited

U.S. PATENT DOCUMENTS

| | | |
|---|---|---|
| 4,574,327 | 3/1986 | Wilner . |
| 5,149,673 | 9/1992 | MacDonald et al. . |
| 5,151,763 | 9/1992 | Marek et al. . |
| 5,367,429 | 11/1994 | Tsuchitani et al. . |
| 5,417,111 | 5/1995 | Sherman et al. . |
| 5,470,797 | 11/1995 | Mastrangelo ............................. 438/53 |
| 5,495,761 | 3/1996 | Diem et al. . |
| 5,496,436 | 3/1996 | Bernstein et al. . |
| 5,659,195 | 8/1997 | Kaiser et al. . |

OTHER PUBLICATIONS

Wenk et al., "Thick polisilicon based surface micromachined capacitive accelerometer with force feedback operation", May 1995, vol. 2642, pp. 84–94.

Analog Devices, "Monolithic Accelerometer with Signal Conditioning", Feb. 16, 1993, pp. 1–11.

*Primary Examiner*—Tuan H. Nguyen
*Attorney, Agent, or Firm*—George C. Chen

[57] ABSTRACT

A method of fabricating a sensor (100) includes providing a substrate (200), providing a stationary comb structure (117, 118) overlying the substrate (200), providing a movable seismic mass (101) overlying the substrate (200) and movable relative to the substrate (200) and the stationary comb structure (117, 118), and providing a dielectric layer (500, 800) between the stationary comb structure (117, 118) and the movable seismic mass (101). The dielectric layer (500) increases the sensitivity of the sensor (100) and also prevents the movable seismic mass (101) from shorting together with the stationary comb structure (117, 118).

28 Claims, 4 Drawing Sheets

METHOD OF FABRICATING A SENSOR

BACKGROUND OF THE INVENTION

This invention relates, in general, to sensors, and more particularly, to a method of fabricating a sensor.

The demand for inexpensive sensor technology is rapidly growing due to the development of navigational and other controls systems for automotive, aerospace, and consumer electronics applications. Semiconductor processing technology provides the capability for micromachining inexpensive sensors such as accelerometers and other transducers. These micromachined sensors typically have a movable structure and a stationary structure, which may have an interdigitated comb-type design. For example, in micromachined accelerometers, the fingers of the movable comb structure are interdigitated between the fingers of the stationary comb structure.

In operation, the movable comb structure is deflected away from or towards the stationary comb structure in response to an acceleration or a change in velocity. As the distance between the movable and stationary comb structures varies, the capacitance between the movable and stationary comb structure also varies, and this variation in capacitance is a measure of the acceleration. However, when the accelerometer is subjected to a large acceleration such as experienced during a collision or impact, the movable comb structure may be deflected such that its fingers physically touch the fingers of the stationary comb structure, and this physical contact produces an undesirable short circuit between the movable and stationary comb structures.

Moreover, the capacitances measured between the movable and stationary comb structures are often extremely small, particularly when the comb structures are fabricated using surface micromachining techniques. The small capacitances are due, in part, to vertical processing limitations that are inherent to surface micromachining technology. The small capacitances are difficult to measure and limit the applicability of micromachined sensors. The micromachined sensor may be enlarged to increase the measured capacitance, but larger micromachined sensors consume more area on a silicon wafer and dramatically increase the potential for fabrication yield loss.

Accordingly, a need exists for a sensor that not only prevents the short circuiting of movable and stationary comb structures but also increases the capacitance between the movable and stationary comb structures without increasing the size of the sensor. The method of fabricating the sensor should be cost-effective, should be compatible with existing semiconductor processing technology, and should not significantly increase the cycle time for manufacturing a sensor.

DETAILED DESCRIPTION OF THE DRAWINGS

Figure 1:
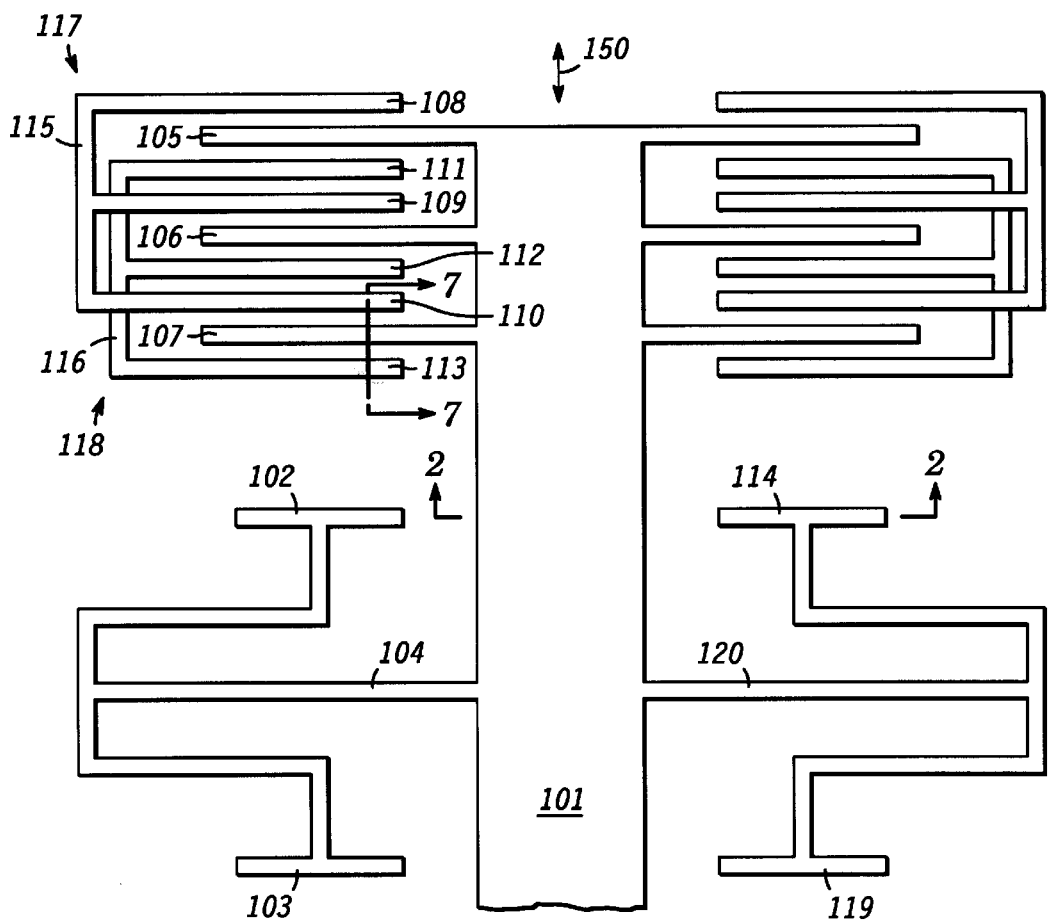
FIG. 1 illustrates a partial top view of an embodiment of a sensor in accordance with the present invention.

Turning to the figures for a more detailed description, FIG. 1 illustrates a partial top view of an embodiment of a sensor 100, which includes two electrically conductive features or structures 117 and 118. Structure 117 has comb fingers 108, 109, and 110, which are electrically coupled together by an anchor 115. Similarly, structure 118 has comb fingers 111, 112, and 113, which are electrically coupled together by an anchor 116. Comb fingers 108, 109, 110, 111, 112, and 113 are supported over a substrate 200 (shown in FIG. 2) by their respective anchors.

Comb fingers 108, 109, 110, 111, 112, and 113 should be substantially rigid, stable, and stationary relative to substrate 200 under a variety of operating conditions for sensor 100. Longer comb finger lengths increase the sensitivity of sensor 100. However, to provide a substantially planar and rigid structure, longer comb finger lengths also require wider comb finger widths and higher comb finger heights, which requires more space. To facilitate the use of sensor 100, comb fingers 108, 109, 110, 111, 112, and 113 are preferably similar in size and shape. Therefore, the specific dimensions for comb fingers 108, 109, 110, 111, 112, and 113 are preferably optimized using mechanical design an analysis for increased sensor sensitivity and reduced sensor size. As an example, comb fingers 108, 109, 110, 111, 112, and 113 each have a width of approximately 2 microns ($\mu$m) along an axis 150, a height of approximately 2 $\mu$m, and a length of approximately 100–300 $\mu$m.

As depicted in FIG. 1, sensor 100 also includes another electrically conductive feature or a central or seismic mass 101. Seismic mass 101 includes seismic mass fingers 105, 106, and 107, which are interdigitated between the comb fingers of structures 117 and 118. In particular, seismic mass finger 105 is partially located between comb fingers 108 and 111; seismic mass finger 106 is partially located between comb fingers 109 and 112; and seismic mass finger 107 is partially located between comb fingers 110 and 113.

The specific dimensions of seismic mass 101 are determined by the capabilities of the semiconductor processing technology required to produce a substantially planar structure and are also determined by the structural stability requirements for sensor 100 under a variety of operating conditions. For example, seismic mass 101 can have a length of approximately 500–1,500 $\mu$m along axis 150, a width of approximately 30–50 $\mu$m, and a thickness of approximately 2 $\mu$m in order to keep seismic mass 101 substantially rigid.

Seismic mass 101 can also have approximately 50–200 fingers to optimize the sensitivity and size of sensor 100. A larger number of seismic mass fingers and a larger size for each of the seismic mass fingers increases the sensitivity of sensor 100 but also increases the size of sensor 100. Preferably, each of seismic mass fingers 105, 106, and 107 have a width of approximately 2 $\mu$m along axis 150, a height of approximately 2 $\mu$m, and a length of approximately 100–300 $\mu$m in order to keep the fingers substantially stationary relative to the rest of seismic mass 101. Seismic mass fingers 105, 106, and 107 are preferably each separated from an adjacent comb finger of structures 117 and 118 by approximately 1–2 $\mu$m to optimize the sensitivity and size of sensor 100. A larger spacing between the seismic mass fingers and the comb fingers not only decreases the sensitivity but also increases the size of sensor 100.

A folded beam or arm 104 couples one side of seismic mass 101 to anchors 102 and 103, and a folded beam or arm 120 couples an opposite side of seismic mass 101 to anchors 114 and 119. Anchors 102, 103, 114, and 119 support arms 104 and 120 and seismic mass 101 over substrate 200. Anchors 102, 103, 114, and 119 and arms 104 and 120 form elastic springs to enable seismic mass 101 to move relative to substrate 200 and structures 117 and 118. The elastic springs have a spring constant that is a function of the structural geometry and material properties of arms 104 and 120 and anchors 102, 103, 114, and 119. As an example, to provide a spring constant of approximately 3–5 Newtons per meter, arm 104 has a length of approximately 130–170 $\mu$m and a height and width of approximately 2 $\mu$m each, and anchors 102 and 103 are spaced approximately 30–50 $\mu$m apart from each other and are spaced approximately 10–30 $\mu$m away from the central or main portion of seismic mass 101.

Seismic mass 101 moves along axis 150 in response to an acceleration or a change in velocity along the plane of substrate 200. Under normal operating conditions, sensor 100 is biased with approximately one to five volts across comb fingers 108, 109, 110, 111, 112, and 113 and seismic mass fingers 105, 106, and 107, which serve as capacitive plates to measure the change in velocity. For example, if an acceleration or a change in velocity moves seismic mass 101 along axis 150 toward comb finger 108, then seismic mass fingers 105, 106, and 107 move toward comb fingers 108, 109, and 110, respectively, and move away from comb fingers 111, 112, and 113, respectively. As a result of this movement, the capacitance increases between seismic mass finger 105 and comb finger 108, between seismic mass finger 106 and comb finger 109, and between seismic mass finger 107 and comb finger 110. Furthermore, the capacitance decreases between seismic mass finger 105 and comb finger 111, between seismic mass finger 106 and comb finger 112, and between seismic mass finger 107 and comb finger 113. Therefore, the change in velocity can be detected by measuring the differential capacitance between seismic mass fingers 105, 106, and 107 and comb fingers 108, 109, 110, 111, 112, and 113. The measured differential capacitance is approximately proportional to the acceleration.

It is understood that the embodiment of FIG. 1 is simplified to facilitate a clear explanation of sensor 100. For example, as known in the art but not illustrated in FIG. 1, sensor 100 can include mechanical stops to limit motion, holes to assist fabrication, and dimples to prevention stiction. As an additional example, sensor 100 can be combined with a transistor 251 (shown in FIG. 2) or an integrated circuit on a single substrate.

Figure 2:
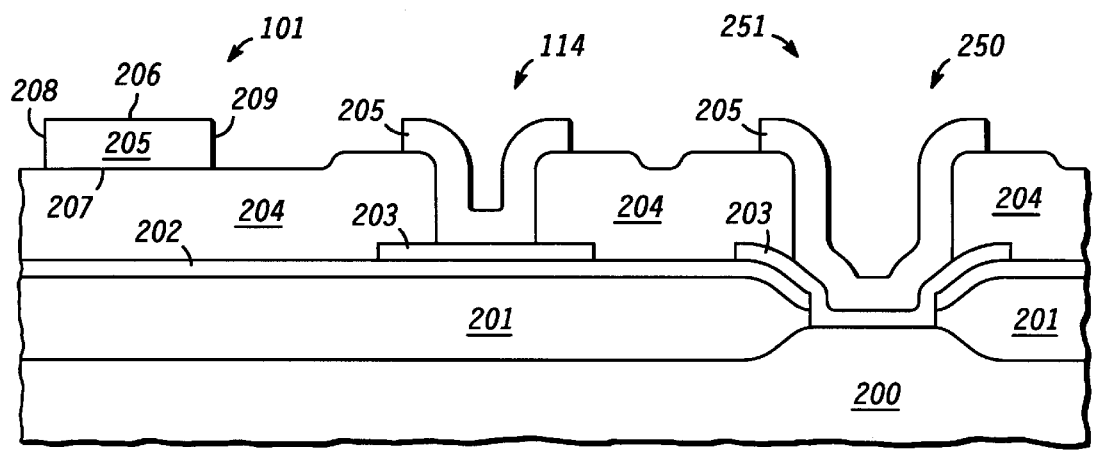
FIGS. 2, 3, and 4 portray cross-sectional views of a portion of the sensor of FIG. 1 taken along reference line 2—2 of FIG. 1 during fabrication in accordance with the present invention.
Figure 3:
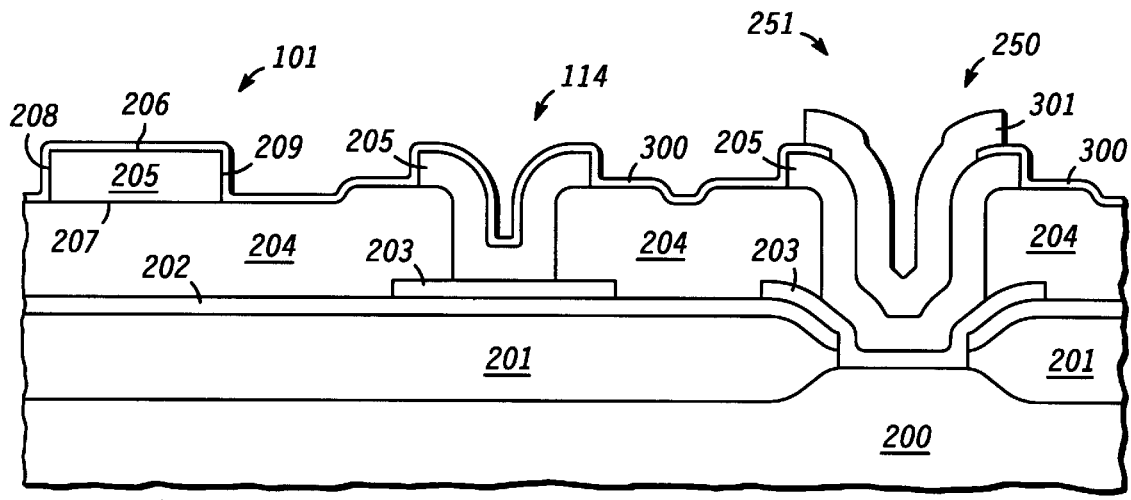
Figure 4:
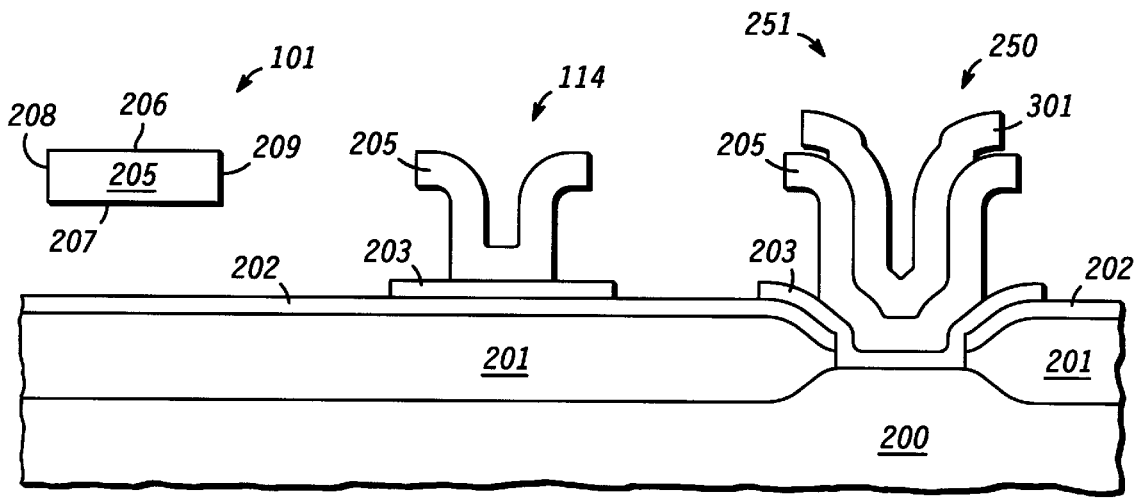

Continuing with the next three figures, FIGS. 2, 3, and 4 portray cross-sectional views of a portion of sensor 100, taken along reference line 2—2 of FIG. 1, during three subsequent stages of fabrication. It is understood that the same reference numerals are used in the figures to denote the same elements.

FIGS. 2, 3, and 4 include two sections. The first section illustrates portions of seismic mass 101 and anchor 114, and the second section illustrates a transistor 251 that is integrated with sensor 100 onto a substrate 200. As mentioned previously, transistor 251 is not included in FIG. 1 to facilitate the explanation of sensor 100.

Substrate 200 is a semiconductor substrate comprised of, for example, n-type silicon or gallium arsenide. A field oxide 201 is formed on substrate 200 using a localized oxidation of silicon (LOCOS) process. Next, approximately 2,000–3,000 angstroms (Å) of a silicon nitride layer 202 is disposed or deposited over field oxide 201 and substrate 200 using a low pressure chemical vapor deposition (LPCVD) technique. Silicon nitride layer 202 is subsequently patterned using a photoresist etch mask and a fluorine-based reactive ion etching process to expose a portion of substrate 200 to facilitate the formation of transistor 251.

Following a pre-polysilicon deposition cleaning step, approximately 3,000–4,000 Å of a polysilicon layer 203 is provided or formed over silicon nitride layer 202, field oxide 201, and substrate 200 using a chemical vapor deposition (CVD) technique. A chlorine-based reactive ion etching technique is used to transfer a pattern from a developed photoresist layer into polysilicon layer 203, which serves as an interconnect layer for sensor 100.

Then, approximately 15,000–25,000 Å of a temporary or sacrificial layer 204 is deposited over polysilicon layer 203 and silicon nitride layer 202. Sacrificial layer 204 is comprised of material that contains a silicon dopant and that can be selectively etched versus polysilicon. In the preferred embodiment, sacrificial layer 204 is comprised of phosphosilicate glass (PSG) for reasons that are discussed hereinafter. In the preferred embodiment, a hydrofluoric acid-based wet etchant is used to pattern sacrificial layer 204 to expose portions of underlying polysilicon layer 203. The hydrofluoric acid-based wet etchant does not significantly etch polysilicon layer 203.

Next, approximately 10,000–25,000 Å of a second polysilicon layer 205 is provided over sacrificial layer 204 and polysilicon layer 203 using a CVD technique. Polysilicon layer 205 is etched with a chlorine-based reactive ion etchant to form anchor 114 and seismic mass 101 having a top surface 206, a bottom surface 207 opposite top surface 206, and side surfaces 208 and 209 adjacent to top surface 206 and bottom surface 207. The etching or patterning of polysilicon layer 205 also begins to form a contact 250, which is a part of transistor 251.

Referring now to FIG. 3, approximately 5,000–15,000 Å of a second temporary or sacrificial layer 300 is conformally deposited over polysilicon layer 205 and sacrificial layer 204. Sacrificial layer 300 is also preferably comprised of PSG. Sensor 100 is subsequently annealed at a temperature of approximately 1,000–1,100 degrees Celsius (°C) for approximately 2–5 hours in an ambient of argon or nitrogen. When sacrificial layers 204 and 300 are both comprised of PSG, the annealing step drives the phosphorous from sacrificial layers 204 and 300 into polysilicon layers 203 and 205, which dopes, lowers the electrical resistance, and alleviates stress in polysilicon layers 203 and 205.

A portion of sacrificial layer 300 located over contact 250 is removed so that 10,000–30,000 Å of a layer 301 comprised of approximately 99 percent aluminum and 1 percent silicon can be sputtered onto polysilicon layer 205 of contact 250. Layer 301 is patterned by using a photoresist etch mask and a wet etchant of phosphoric acid, acetic acid, nitric acid, and deionized water. Then, layer 301 is annealed at a temperature of approximately 350–450° C. for approximately 15–60 minutes in a forming gas ambient to transform contact 250 into an ohmic metal contact for transistor 251. Other features of transistor 251 are fabricated using semiconductor processing techniques known in the art.

Turning to FIG. 4, sacrificial layers 204 and 300 are removed to release seismic mass 101. After sacrificial layers 204 and 300 are removed, seismic mass 101 is unobstructed and becomes movable. When sacrificial layers 204 and 300 are both comprised of similar materials including, but not limited to, PSG, a single etchant such as, for example, a hydrofluoric acid-based wet isotropic etchant can be used to remove both sacrificial layers 204 and 300. The use of a single etchant to remove both sacrificial layers 204 and 300 simplifies processing and reduces the cost and cycle time for manufacturing sensor 100. Layer 301, polysilicon layers 203 and 205, and silicon nitride layer 202 are not significantly etched by the hydrofluoric acid-based wet etchant used to remove sacrificial layers 204 and 300.

Figure 5:
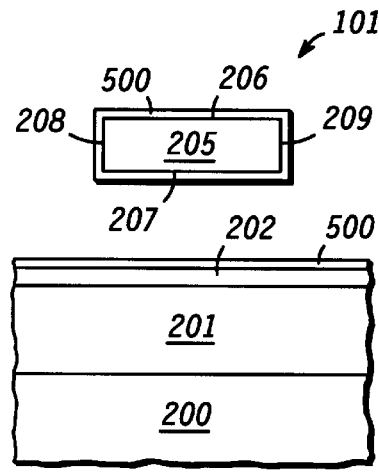
FIGS. 5 and 6 depict partial cross-sectional views of the portion of the sensor of FIG. 1 taken along reference line 2—2 of FIG. 1 after the fabrication steps of FIGS. 2, 3, and 4 in accordance with the present invention.
Figure 6:
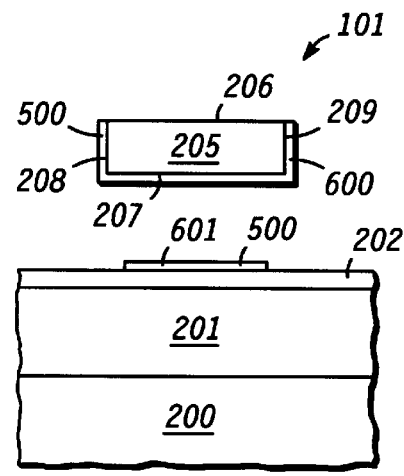

Continuing with the next two figures, FIGS. 5 and 6 depict partial cross-sectional views of the portion of sensor 100 taken along reference line 2—2 of FIG. 1 after the fabrication steps of FIGS. 2, 3, and 4. In the embodiment of FIG. 5, approximately 200–800 Å of a dielectric layer 500 is provided or conformally deposited over silicon nitride layer 202 and over surfaces 206, 207, 208, and 209 of seismic mass 101 using an LPCVD or plasma enhanced chemical vapor deposition (PECVD) technique. A PECVD technique is preferred because its lower deposition temperatures will not damage contact 250, which is comprised of aluminum and which can be damaged at high temperatures. Accordingly, dielectric layer 500 is preferably deposited at a temperature below approximately 450° C.

Alternatively, a metal layer comprised of a refractory metal such as, for example, tungsten, can be used in place of the aluminum silicon for layer 301. In this embodiment, contact 250 would not be damaged if dielectric layer 500 were deposited using a higher temperature deposition process such as an LPCVD technique.

In FIG. 6, an anisotropic etching technique is used to remove dielectric layer 500 off of surface 206 of seismic mass 101 and off of portions of silicon nitride layer 202. This anisotropic etching technique does not use an etch mask and is a self-aligned process. The anisotropic etching technique is needed to expose layer 301 so that contact 250 (in FIG. 4) can be coupled to a subsequently fabricated interconnect line (not shown).

When dielectric layer 500 is comprised of silicon nitride or silicon oxide, a fluorine-based reactive ion etching technique can be used to remove the desired portions of dielectric layer 500. The fluorine-based reactive ion etchant is preferably used because it selectively etches dielectric layer 500 versus polysilicon layer 205. Because the fluorine-based reactive ion etchant is anisotropic, portion 600 of dielectric layer 500 is left overlying surfaces 207, 208, and 209 of seismic mass. In some cases, portion 600 completely or fully covers surfaces 207, 208, and 209. A residual portion 601 of dielectric layer 500 is left overlying silicon nitride layer 202 because residual portion 601 is underneath seismic mass 101 and is not substantially etched by the anisotropic etchant.

Figure 7:
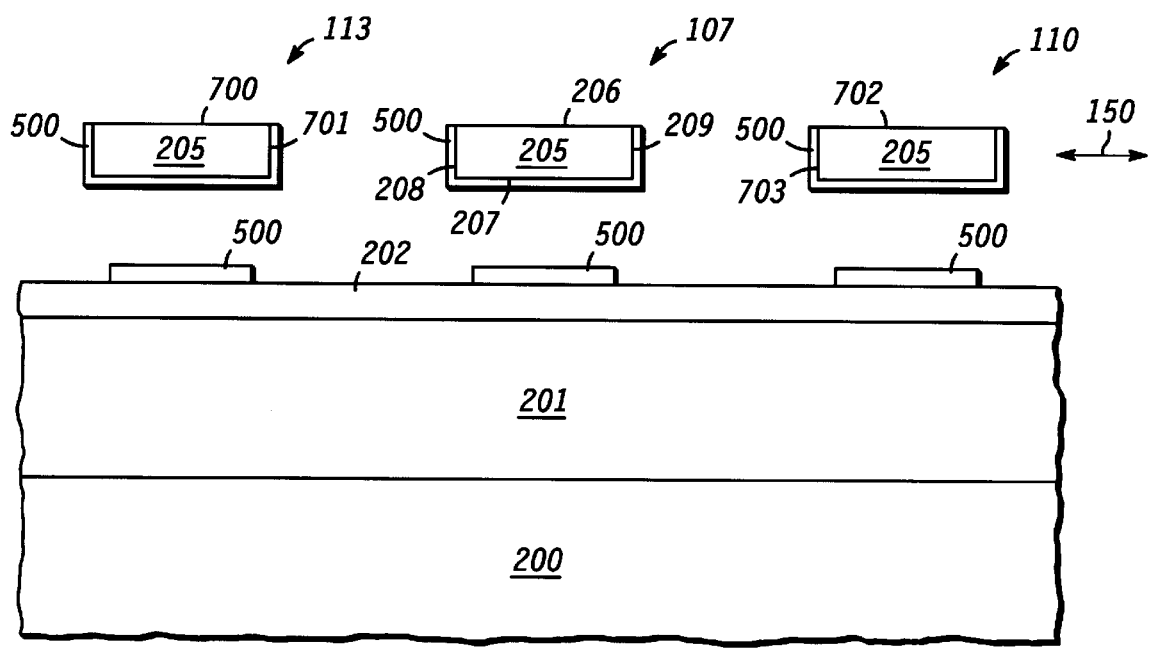
FIG. 7 illustrates a cross-sectional view of a portion of the sensor of FIG. 1 taken along reference line 7—7 after the fabrication steps of FIGS. 2–6 in accordance with the present invention.

FIG. 7 illustrates a cross-sectional view of a portion of sensor 100 taken along reference line 7—7 of FIG. 1 after the fabrication steps of FIGS. 2, 3, 4, 5, and 6. FIG. 7 portrays seismic mass finger 107 between comb fingers 113 and 110. Similar to the cross-sectional view of FIG. 6, FIG. 7 shows that surfaces 207, 208, and 209 of seismic mass finger 107 remain fully covered by dielectric layer 500.

Moreover, comb finger 113 has a surface 701, which faces towards surface 208 of seismic mass finger 107 and which also remains covered by dielectric layer 500 after the anisotropic etch for dielectric layer 500. Comb finger 113 also has a surface 700, which is located adjacent to surface 701, which faces away from seismic mass finger 107 and seismic mass 101, and which is exposed and is not covered by dielectric layer 500 after the anisotropic etch for dielectric layer 500.

Similarly, comb finger 110 has a surface 703, which faces towards surface 209 of seismic mass finger 107 and which remains covered by dielectric layer 500 after the anisotropic etch for dielectric layer 500. Comb finger 110 also has a surface 702, which is located adjacent to surface 703, which faces away from seismic mass finger 107 and seismic mass 101, and which is exposed and is not covered by dielectric layer 500 after the anisotropic etch for dielectric layer 500.

In operation, as an acceleration or a change in velocity along the plane of substrate 200 deflects or moves seismic mass 101, seismic mass finger 107 moves along axis 150 toward and away from comb fingers 110 and 113. If the change in velocity is large enough to cause seismic mass finger 107 to contact comb fingers 110 or 113, seismic mass finger 107 will not be electrically shorted together with comb fingers 110 or 113 as in the prior art. Instead, if seismic mass finger 107 contacts comb fingers 110 or 113, dielectric layer 500 provides a layer of electrical insulation between seismic mass finger 107 and comb fingers 110 or 113, which prevents electrical shorting.

Furthermore, providing or inserting a dielectric layer between two capacitive plates increases the sensitivity of a capacitor compared to when the two capacitive plates only have air between them. Therefore, in addition to providing electrical insulation, dielectric layer 500 also increases the sensitivity of sensor 100, which produces a higher signal-to-noise ratio.

As an additional advantage, dielectric layer 500 also increases the strength of structures 117, 118, and seismic mass 101. The increased strength enhances the rigidity of comb fingers 108, 109, 110, 111, 112, and 113 to ensure that the comb fingers remain substantially stationary relative to substrate 200. Furthermore, the increase strength also enhances the rigidity of seismic mass fingers 105, 106, and 107 to ensure that the seismic mass fingers remain substantially stationary relative to the rest of seismic mass 101.

Figure 8:
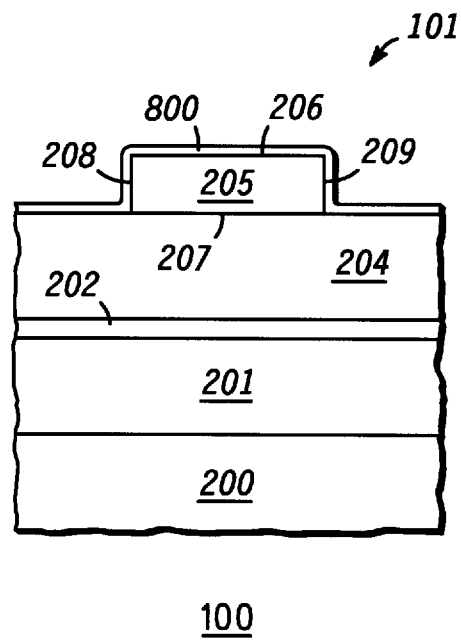
FIGS. 8 and 9 represent partial cross-sectional views of the portion of the sensor of FIG. 1 taken along reference line 2—2 of FIG. 1 during an alternate method of fabrication in accordance with the present invention.
Figure 9:
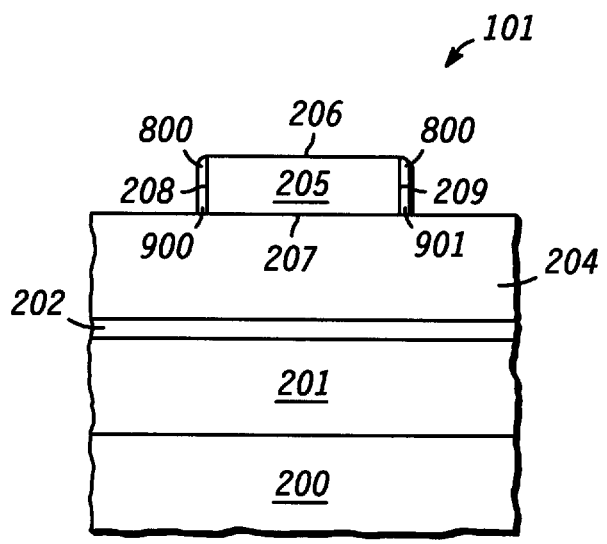

In an alternative embodiment, FIGS. 8 and 9 represent partial cross-sectional views of the portion of sensor 100 taken along reference line 2—2 of FIG. 1 during an alternative method of fabricating sensor 100. Continuing from FIG. 2, FIG. 8 illustrates a dielectric layer 800 overlying sacrificial layer 204 and surfaces 206, 208, and 209 of seismic mass 101. Dielectric layer 800 serves a similar function as dielectric layer 500 in FIGS. 5, 6, and 7. Accordingly, dielectric layer 800 increases the sensitivity of sensor 100 by increasing its capacitance, prevents seismic mass 101 from shorting together with structures 117 or 118, and improves the rigidity of seismic mass fingers 105, 106, and 107 and comb fingers 108, 109, 110, 111, 112, and 113.

The deposition temperature for dielectric layer 800 in FIG. 8 can be higher than that used for depositing dielectric layer 500 in FIG. 5 because dielectric layer 800 is deposited before layer 301 is deposited while dielectric layer 500 is deposited after layer 301 is deposited. As mentioned previously, after layer 301 is deposited and etched and after contact 250 is annealed, high temperatures can damage contact 250. Therefore, because dielectric layer 800 is deposited prior to layer 301, a higher temperature can be used to deposit dielectric layer 800 compared to dielectric layer 500. The higher deposition temperature can improve the conformality of dielectric layer 800 over that of dielectric layer 500. When sacrificial layer 204 is comprised of PSG, dielectric layer 800 is preferably comprised of silicon nitride and can be deposited using an LPCVD process.

FIG. 9 portrays dielectric layer 800 after an anisotropic etching step that does not use an etch mask. When comprised of silicon nitride, dielectric layer 800 can be selectively anisotropically etched versus sacrificial layer 204 and can also be selectively anisotropically etched versus polysilicon layer 205 by using a fluorine-based reactive ion etching technique. After the anisotropic etch for dielectric layer 800, portions 900 and 901 of dielectric layer 800 are kept or remain over surfaces 208 and 209, respectively, of seismic mass 101. Accordingly, portions 900 and 901 of dielectric layer 800 are self-aligned.

The aforementioned processing steps of FIGS. 3 and 4 can then be performed to complete the fabrication of sensor 100. When sacrificial layers 204 and 300 are comprised of PSG and when dielectric layer 800 is comprised of silicon nitride, the subsequent removal of sacrificial layers 204 and 300 does not substantially etch the remaining portions 900 and 901 of dielectric layer 800 in FIG. 9.

In an alternative embodiment, dielectric layer 800 of FIGS. 8 and 9 can be substituted for sacrificial layer 300 in FIG. 3. In this alternative embodiment, dielectric layer 800 is used as the temporary layer during the formation of layer 301 for contact 250. substituting dielectric layer 800 for sacrificial layer 300 reduces the cost and cycle time of manufacturing sensor 100. An anisotropic etchant that does not substantially etch layer 301 or polysilicon layer 205 is used to etch dielectric layer 800, and portions 900 and 901 of dielectric layer 800 remain after the anisotropic etch. Then, an isotropic etchant such as, for example, a hydrofluoric acid-based etchant is used to remove sacrificial layer 204 without significantly etching polysilicon layer 205 and while keeping portions 900 and 901 of dielectric layer 800 overlying surfaces 208 and 209, respectively, of seismic mass 101.

Therefore, in accordance with the present invention, it is apparent there has been provided an improved method of fabricating a sensor that overcomes the disadvantages of the prior art. The present invention eliminates electrical shorting between a movable seismic mass and a stationary comb finger while improving sensor sensitivity and increasing structural rigidity. The present invention is cost-effective, compatible with existing semiconductor processing techniques, and does not significantly increase the cycle time for manufacturing a sensor.

While the invention has been particularly shown and described with reference to preferred embodiments, it will be understood by those skilled in the art that changes in form and detail may be made without departing from the spirit and scope of the invention. Accordingly, the disclosure of the present invention is not intended to be limiting but, instead, is intended to be illustrative of the scope of the invention, which is set forth in the following claims.

We claim:

1. A method of fabricating a sensor comprising the steps of:
   providing a substrate having a surface;
   providing a temporary layer overlying the surface;
   providing a first structure overlying the surface;
   providing a second structure overlying the temporary layer wherein a capacitance is formed between the first and second structures;
   increasing a sensitivity of the sensor by providing a dielectric layer between the first structure and the second structure to increase the capacitance; and
   removing the temporary layer such that the second structure is movable in a direction approximately parallel to the surface, wherein the removing step occurs after the increasing step.

2. The method according to claim 1 wherein the step of increasing the sensitivity of the sensor includes forming the dielectric layer so that shorting of the first and second structures is substantially prevented.

3. The method according to claim 1 wherein the step of increasing the sensitivity of the sensor includes providing the dielectric layer fully covering a surface of the second structure, the surface facing towards the first structure.

4. The method according to claim 1 wherein the step of increasing the sensitivity of the sensor includes providing the dielectric layer contacting a surface of the first structure, the surface facing towards the second structure.

5. The method according to claim 1 wherein the step of increasing the sensitivity of the sensor includes selecting the dielectric layer from the group consisting of silicon oxide or silicon nitride.

6. The method of claim 1 wherein increasing the sensitivity includes disposing the dielectric layer adjacent to a side surface of the second structure wherein the side surface is located at a perimeter of the second structure, faces towards the first structure, and is devoid of facing towards the surface of the substrate.

7. The method of claim 1 further comprising disposing a third structure overlying the substrate wherein the second structure is located between the first and third structures and wherein the dielectric layer is between the first and third structures.

8. The method of claim 1 wherein providing the second structure includes forming a gap between the second structure and the substrate wherein the gap remains unsealed beneath the second structure.

9. A method of fabricating a sensor comprising the steps of:
   providing a substrate having a substrate surface;
   providing a structure overlying the substrate surface;
   providing a seismic mass having a first surface, having a second surface, and overlying the substrate surface, the first surface of the seismic mass facing towards the structure and devoid of facing towards the substrate surface, the second surface of the seismic mass facing away from the structure;
   depositing a dielectric layer to contact the first and second surfaces of the seismic mass; and
   keeping a first portion of the dielectric layer contacting the first surface of the seismic mass while removing a second portion of the dielectric layer contacting the second surface of the seismic mass.

10. The method according to claim 9 further comprising the steps of:
    depositing a sacrificial layer over the substrate surface before providing the seismic mass; and
    removing the sacrificial layer to make the seismic mass movable relative to the seismic mass and the structure.

11. The method according to claim 10 wherein the removing step occurs after depositing the dielectric layer and after keeping the first portion of the dielectric layer.

12. The method of claim 10 wherein providing the dielectric layer occurs after depositing the sacrificial layer and occurs before removing the sacrificial layer.

13. The method according to claim 9 wherein the step of keeping the first portion of the dielectric layer includes using a fluorine-based reactive ion etching technique.

14. The method according to claim 9 wherein the step of keeping the first portion of the dielectric layer includes increasing a capacitance between the structure and the seismic mass and preventing the structure from being shorted together with the seismic mass.

15. The method of claim 9 further comprising disposing a second structure overlying the substrate wherein the seismic mass is between the structure and the second structure.

16. The method of claim 9 wherein providing the seismic mass includes providing the first surface at a perimeter of the seismic mass and substantially perpendicular to the substrate surface.

17. The method of claim 9 wherein providing the seismic mass includes forming a space underneath the seismic mass wherein the space remains unsealed beneath the seismic mass.

18. The method of claim 9 wherein providing the seismic mass includes enabling the seismic mass to move in a direction substantially parallel to the substrate surface.

19. A method of fabricating an accelerometer comprising the steps of:

providing a substrate having a substrate surface;

depositing a sacrificial layer overlying the substrate surface;

forming two electrically conductive structures overlying the substrate surface, the two electrically conductive structures each having a first structure surface and a second structure surface located adjacent to the first structure surface, the first structure surfaces substantially perpendicular to the substrate surface, the two electrically conductive structures stationary relative to the substrate;

forming a seismic mass overlying the sacrificial layer, the seismic mass having a first seismic mass surface, a second seismic mass surface opposite the first seismic mass surface, a third seismic mass surface adjacent to the first seismic mass surface and the second seismic mass surface, and a fourth seismic mass surface opposite the third seismic mass surface and adjacent to the first seismic mass surface and the second seismic mass surface, the seismic mass having a portion located partially between the two electrically conductive structures, the first seismic mass surface and the second seismic mass surface of the portion of the seismic mass facing towards the first structure surfaces of the two electrically conductive structures;

depositing an electrically insulative layer contacting the first, second, and third seismic mass surfaces; and removing a first portion of the electrically insulative layer contacting the third seismic mass surface while leaving a second portion of the electrically insulative layer contacting the first and second seismic mass surfaces.

20. The method according to claim 19 wherein the step of depositing the electrically insulative layer includes depositing the electrically insulative layer contacting the first and second structure surfaces of the two electrically conductive structures and further comprising the step of removing a third portion of the electrically insulative layer from the second structure surfaces of the two electrically conductive structures while leaving a fourth portion of the electrically insulative layer contacting the first structure surfaces of the two electrically conductive structures.

21. The method according to claim 19, further comprising the step of removing the sacrificial layer before the step of depositing the electrically insulative layer wherein the seismic mass is movable relative to the two electrically conductive structures and the substrate after the step of removing the sacrificial layer, wherein the step of depositing the electrically insulative layer includes depositing the electrically insulative layer contacting the fourth seismic mass surface, and wherein the step of removing the first portion of the electrically insulative layer includes leaving the second portion of the electrically insulative layer contacting the fourth seismic mass surface.

22. The method according to claim 21 wherein the step of depositing the electrically insulating layer includes depositing the electrically insulating layer at a temperature below 450 degrees Celsius.

23. The method according to claim 19 further comprising the step of removing the sacrificial layer after the step of depositing the electrically insulative layer wherein the second portion of the electrically insulative layer substantially remains contacting the first and second seismic mass surfaces after the step of removing the sacrificial layer.

24. The method according to claim 19 wherein the step of removing the first portion of the electrically insulating layer includes anisotropically etching the electrically insulating layer.

25. The method according to claim 19 wherein the step of removing the first portion of the electrically insulative layer includes anisotropically etching the electrically insulative layer without using a photoresist etch mask.

26. The method of claim 19 wherein forming the seismic mass includes providing the first, second, third, and fourth seismic mass surfaces at a perimeter of the seismic mass.

27. The method of claim 26 wherein forming the seismic mass includes creating a space between the seismic mass and the substrate surface and further comprising keeping the space unsealed beneath the seismic mass.

28. The method of claim 27 wherein forming the seismic mass includes enabling the seismic mass to move in a direction approximately parallel to the substrate surface.

* * * * *